Dec. 20, 1960  A. H. HANSON  2,964,965
DEVICE FOR REMOTE CONTROL OPERATION OF AUTOMOBILE FOOT PEDALS
Filed March 15, 1957  3 Sheets-Sheet 1
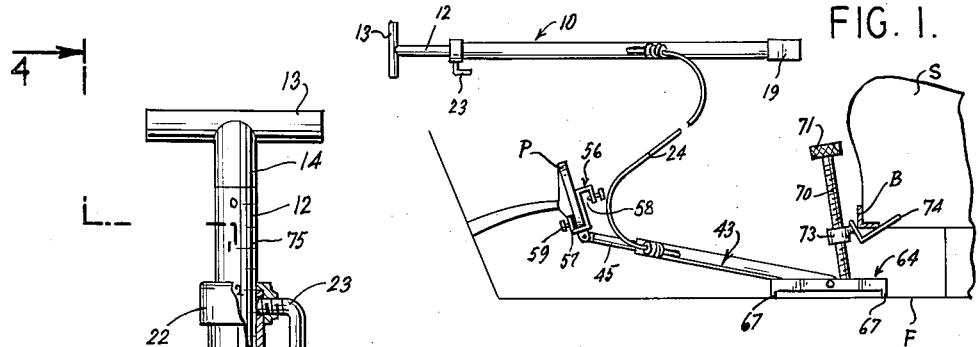
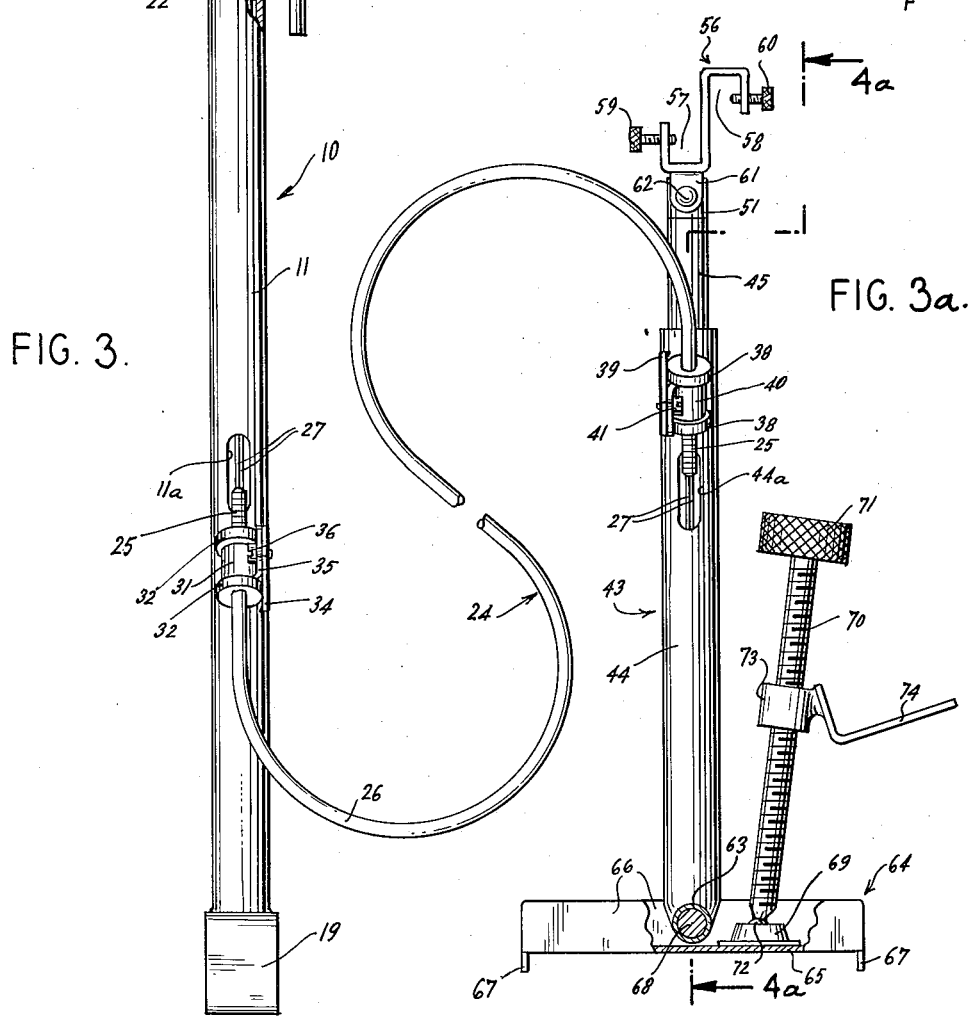
INVENTOR
ALFRED H. HANSON
BY Amster & Levy
ATTORNEYS Dec. 20, 1960  A. H. HANSON  2,964,965
DEVICE FOR REMOTE CONTROL OPERATION OF AUTOMOBILE FOOT PEDALS
Filed March 15, 1957  3 Sheets-Sheet 2

INVENTOR.
ALFRED H. HANSON
BY
Amster & Levy
ATTORNEYS

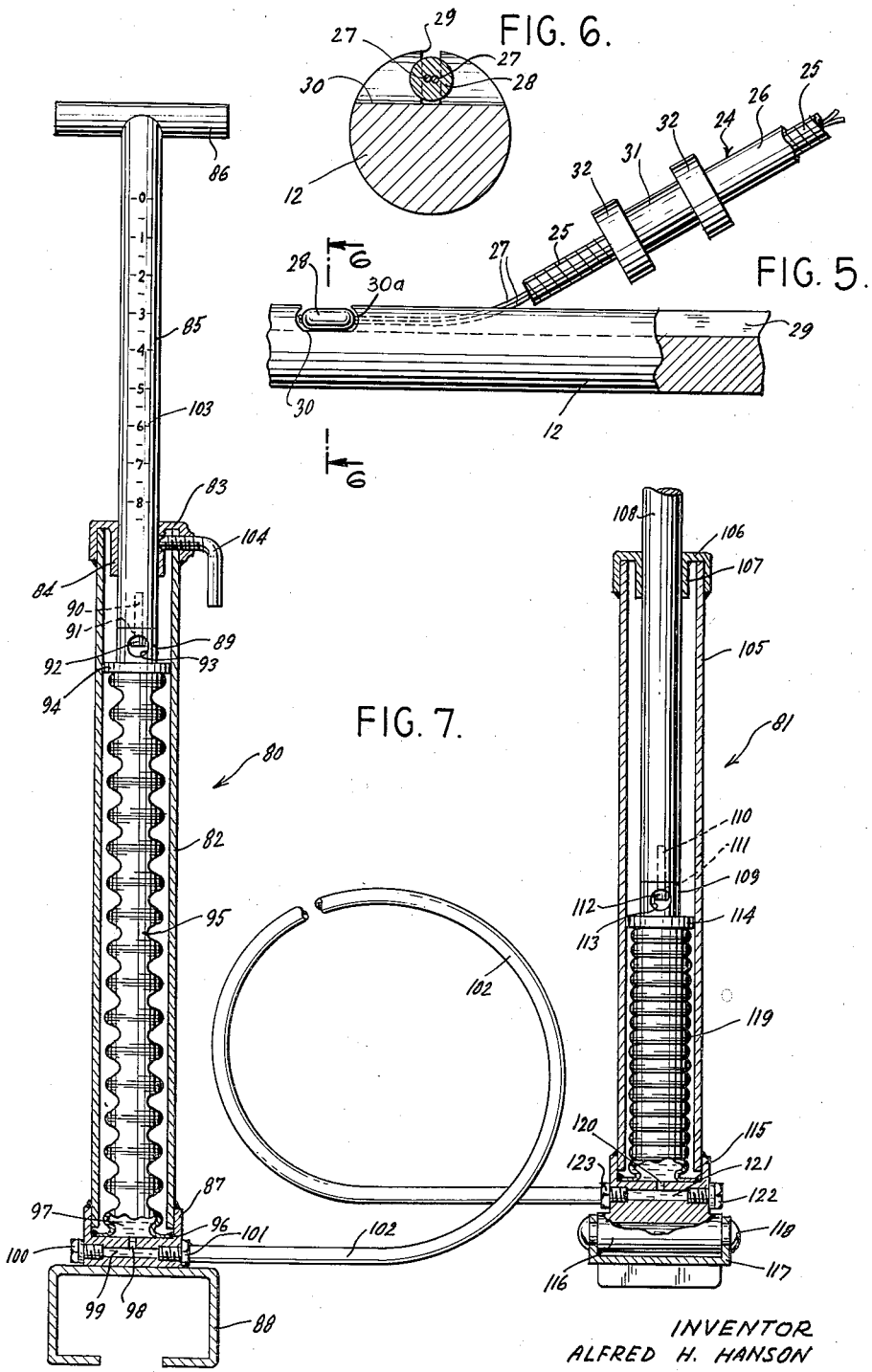

United States Patent Office 2,964,965
Patented Dec. 20, 1960

2,964,965

DEVICE FOR REMOTE CONTROL OPERATION OF AUTOMOBILE FOOT PEDALS

Alfred H. Hanson, % Hanson Development Co., Garrison, N.Y.

Filed Mar. 15, 1957, Ser. No. 646,440

3 Claims. (Cl. 74—481)

My invention relates to a new and improved remote control device for operation of the foot pedals of an automotive vehicle from a remote position during service and repair.

In many types of automobile servicing, such as brake repair, engine adjustment, etc. it is necessary to control the brake or accelerator action of the vehicle in order to properly diagnose operation or to make adjustments. Such diagnoses or adjustment usually remove the mechanic from the location of the brake and accelerator pedals. In addition to the mechanic who is doing the service work, this type of operation normally requires the assistance of a second person who must sit in the driver's compartment and actuate the brake or accelerator pedal.

As an example, several phases of hydraulic brake repair or service work require the use of an assistant to actuate the brake pedal while the mechanic performs his work directly at the wheel location. Since such work invariably requires the vehicle to be placed on a lift or over a grease pit, the mechanic must do his work beneath the vehicle either under the raised lift or down in the pit. Consequently, it is impractical for him to operate the brake pedal or to inspect the brake pedal reaction, and certainly it is impossible for him to operate the brake pedal at the same time that he is making the brake adjustments. An assistant is therefore required to actuate the pedal in accordance with verbal instructions from the mechanic. Such instructions are often misinterpreted or are confusing to the assistant resulting in inefficiency. Furthermore, it is difficult, if not impossible, for the assistant, in response to verbal instructions, to apply the exact pedal pressure which is required.

Similar disadvantages and inconveniences are encountered in engine testing or adjustment where engine speed must be controlled. For this purpose it is again normally necessary to have an assistant operate the accelerator pedal, so that controlled acceleration and steady engine speeds are difficult to obtain when needed. As an alternative, the mechanic may attempt to operate the throttle linkage while at the same time examining or testing the engine, but the heavy spring force on the throttle makes it extremely difficult to attain controlled or fixed, steady engine speeds. Further, since throttle linkages vary widely in placement and construction, it is often impossible for the mechanic to reach and operate the linkage from his place of observation.

It is an object of the invention, therefore to provide a remote control device consisting of an actuating unit and a control unit connected by a long flexible coupling, whereby the actuating unit may be attached to the brake or accelerator pedal within an automobile body and the control unit may be carried to a remote point, such as to the vehicle front or rear or beneath the chassis, as when the vehicle is on a lift, for manual actuation by the operator while he observes or tests the results of the foot pedal action.

Modern automobile and truck design is such that brake pedal, accelerator pedal, and seat dimensioning and positioning is substantially uniform whether the vehicle be a large truck or small passenger car. Such dimensioning and positioning is dictated by the size of the human body, rather than by the size of the vehicle. I am therefore able to provide a simple mounting arrangement for the actuating unit whereby it may be quickly and easily clamped beneath the driver's seat and coupled to the appropriate foot pedal for operation of the latter in response to operation of the remotely located control unit.

Another object of the invention is the provisions of a remote control device which is so arranged and constructed that in operation of the control unit, the operator is enabled to "feel" the operation of the pedal being actuated.

A further object of the invention is the provision of a remote control device of the character described in which the control unit is provided with locking means by which the foot pedal may be maintained at a fixed and exact setting or degree of depression while the mechanic performs the required work. In this connection, the control member may also be provided with a graduated scale of calibrations by means of which the mechanic may visually determine the distance to which the foot pedal has been depressed or raised.

A further object of the invention is the provision of a remote control device of the character described in which an extremely flexible line connects the control unit with the actuating unit, so that the brake or accelerator pedal may be remotely controlled from any position around the vehicle. The flexible line or cable is made of such length that control is possible when the vehicle is on a lift and elevated to the normal working height.

A further object of the invention is the provision of a remote control device of the character described which permits the ready and convenient performance of testing and adjustment operations which heretofore could not be properly or efficiently performed without the use of two persons.

Additional objects and advantages of the invention will become apparent during the course of the following specification when taken in connection with the accompanying drawings, in which:

Fig. 1 is an elevational view showing a remote-control foot-pedal actuating device made in accordance with the invention and mounted in the driver's compartment of an automobile in engagement with the brake pedal thereof;

Figs. 3 and 3a are respective front elevational views of the actuating and control units of the foot pedal actuating device shown dismounted from the automobile, and showing the manner in which they are connected together, with portions broken away to reveal interior details thereof and for convenience of illustration;

Figures 4, 4A:
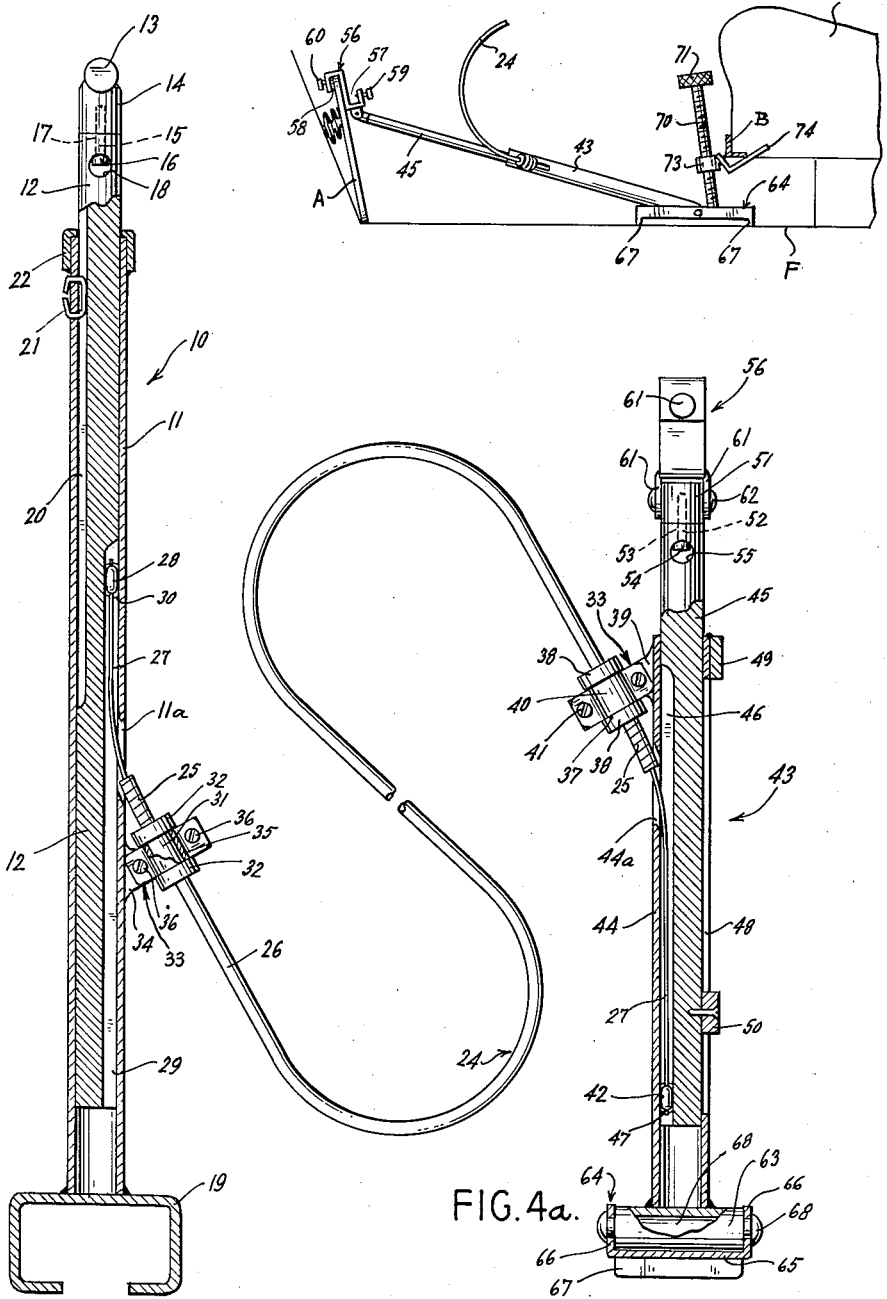

Figs. 4 and 4a are respective sectional views of the units shown in Figs. 3 and 3a, the vertical sections being taken through the control unit and actuating unit along respective section lines 4—4 and 4a—4a of Figs. 3 and 3a;

Fig. 5 is a partial enlarged elevation showing in detail the coupling of the flexible cable wire to the control unit;

Fig. 6 is an enlarged section taken along line 6—6 of Fig. 5; and

Fig. 7 is a vertical section similar to the views of Figs. 4 and 4a, but showing a modified form of hydraulic foot-pedal actuating device made in accordance with the invention.

Referring in detail to the drawings, particularly Figs. 3 and 4, the control unit 10 comprises a cylindrical housing 11 in which a rod 12 is mounted for longitudinal sliding movement. The rod 12 projects above the top of the cylindrical housing 11 and at its top projecting end is coupled to a handle 13. The coupling of the handle 13 is a swivel coupling and comprises a terminal rod extension piece 14 to which the handle 13 is secured, and which carries a fixed depending pin 15, as shown in Fig. 4. The pin 15 extends through a longitudinal bore 17 in the rod 12 and has a head 16 contained within an enlarged transverse bore or opening 18 in the rod. The pin 15 may thus rotate within the handle bore 17 for swivel movement of the handle 13 to selected angular positions of desired operation, while the head 16 prevents the handle 13 from being pulled off the rod 12.

The bottom end of housing 11 is closed off by a stirrup piece 19 which is fixedly secured thereto. The stirrup piece 19 is sized to receive the foot of the operator for actuation of the control unit 10, and is split at its center so that it may be mounted on a fixed support, as for example, a portion of the automobile chassis, if desired.

The rod 12 has an elongated longitudinal slot 20 in its upper circumference which is sized to receive a key member to prevent rotation of the rod 12 within the cylindrical housing 11. The key member may be in the form of a bent wire or staple 21 affixed to the inner wall of the housing, as shown in Fig. 4. The top end of the housing 11 is closed off by a cap 22 which is fixed to said housing and has a central opening sized to slidably receive the rod 12. An L-shaped set screw 23 is threadedly received in the wall of cap 22 and the wall of housing 11, the inner end of the set screw 23 being adapted to engage the rod 12 and lock the latter in a selected adjustment position in housing 11.

The control unit 10 is connected to the actuator unit of the device by a flexible cable 24 which includes a flexible tube 25 in the nature of a spirally-wound metal sheath enclosed in a flexible cover 26 made of plastic, rubber or the like. Slidably contained within the tube 25 are a pair of wires 27 which are preferably made of a high tensile, hard metal alloy, such as ordinary piano wire. In a practical embodiment, the two wires 27 are each of about .050 inch diameter. One end of the wires 27 extend through an opening 11a in the wall of housing 11, and are connected to a metal bead 28, as shown in Figs. 4, 5 and 6. The rod 12 is provided with an elongated longitudinally-extending narrow slot 29 which constitutes a guide for the wires 27 and prevents binding of the wires against the inner wall of housing 11 during operation of the control unit 10. The narrow slot 29 terminates in and communicates with an enlarged transverse slot 30 (Fig. 5) which has arcuate side walls 30a. The bead 28 is sized to be seated in the transverse slot 30 and because of the arcuate side walls 30a thereof, the bead is permitted free rotation within the slot. This permits twisting of the flexible cable 24 without fouling of the wires 27 and consequent interference with the proper operation of the flexible cable.

The flexible tube 25 is fixed relative to the housing 11 by a collar 31 which is secured to the end portion of said tube 25 and has a pair of end circular flanges 32. A bracket 33 carried by the housing 11 embraces and holds the collar 31 between the flanges 32. This bracket 33 comprises a fixed arm 34 rigidly secured to the housing wall and a clamp piece 35 attached to the arm 34 by screws 36. The bracket 33 is sized to prevent axial movement of the collar 31, while at the same time affording free rotation thereof, thereby permitting the taking up of any twisting of the flexible cable.

At the other end of the flexible tube 25 there is secured a similar collar 37 having terminal flanges 38. The collar 37 is rotatably mounted on arm 39 by clamp piece 40 which is attached to said arm by screws 41. The other end of the pair of wires 27 are attached to a bead 42 which is connected to the actuating unit 43.

The actuating unit 43 is shown in Figs. 3a and 4a, and comprises a cylindrical housing 44 containing a slidable rod 45. The rod 45 has an elongated longitudinal slot 46 which houses the ends of the wires 27 and communicates with a transverse slot 47 which serves as a seat for the terminal bead 42, and which is similar in size and shape to the transverse slot 30 previously described.

The actuator unit housing 44 has an elongated longitudinal slot 48 through which slidably extends a key piece 50, the latter being secured to the rod 45 and being movable therewith. A stop member 49 is affixed to the outer wall of the housing 44 adjacent the top end of said slot 48, the stop member 49 engaging the key piece 50 to halt upward movement of rod 45. In addition, the key piece 50 cooperates with slot 48 to prevent turning of the rod 45 within the housing 44.

The rod 45 has a terminal extension piece 51 which is rotatably mounted on the end of the rod 45 which projects from housing 44. The extension piece 51 carries a fixed depending swivel pin 52 which is turnably contained in a bore 53 of rod 45. The pin 52 has a head 54 located within a transverse bore 55. This mounting permits the extension piece 51 to rotate relative to rod 45 in the same manner as previously described in connection with the swivel mount 15, 16, 17, 18 of the control unit handle 13.

Mounted on the extension piece 51 is an S-shaped mounting bracket 56 adapted to be secured to the appropriate foot pedal of the automobile in a manner which will be presently described. The S-shaped bracket 56 is shaped to form a pair of oppositely-facing mounting channels 57 and 58, as can be best seen in Fig. 3a. The mounting channels 57 and 58 are in the nature of individual C-clamps, and for this purpose each is provided with a respective set screw 59 and 60. As shown in Figs. 3a and 4a, the bracket 56 has a pair of depending ears 61 which are swivelly mounted on the rod extension piece 51 by a pivot pin 62. This swivel connection in conjunction with the rotatable mounting of the extension piece 51 on rod 45, constitutes a universal mounting for the bracket 56.

At its closed bottom end, the cylindrical housing 44 is fixed to a transverse tubular member 63 which is turnably mounted on a base member or stand 64. The latter includes a base plate 65 integral with upstanding side walls 66 and depending end walls 67. The end walls 67 extend downwardly below the base plate 65 to serve as legs upon which the base member 64 rests. The tubular member 63 is turnably mounted on the stand 64 by a pivot pin 68 which extends through said tubular member and is connected at its end to the upstanding side walls 66.

A swivel socket 69 is secured to the upper surface of the base plate 65, as shown in Fig. 3a, to act as a swivel mount for a bolt 70. Said bolt 70 has a knurled head 71, and at its opposite end termnates in a fixed ball 72 which is seated in said swivel socket 69. An internally threaded sleeve 73 is adjustably mounted on the threaded shank of bolt 70, the sleeve 73 carrying an angle bracket 74.

Fig. 1 shows the manner in which the actuator unit 43 is mounted in vehicle. The base member 64 is placed partially beneath the seat S with the bolt 70 in a substantially upright position. The bolt 70 is then turned by means of its knurled head 71, in a direction to raise the angle bracket 74. The angle bracket 74 engages the metal cross bar B at the lower front edge of the seat and presses the base member legs 67 tightly against the rubber or carpet matting of the floor F, thereby clamping the base member 64 immovably within the automobile and proximate to the foot pedal to be actuated. The housing 44 is then pivoted on its pivot pin 68 and the rod 45 extended therefrom until the mounting brocket 56 is positioned to be attached to the foot pedal. For this purpose, the bracket 56 may be further adjusted by swivelling it on its pivot pin 62 and turning the rod extension 51, so that the bracket can be readily secured to pedals of various sizes.

Figure 2:
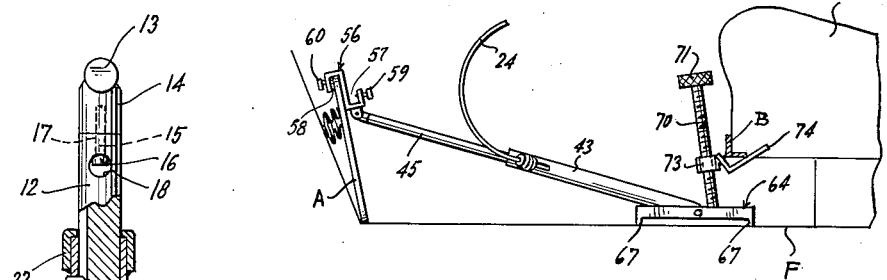
Fig. 2 is a partial elevational view similar to Fig. 1 but showing the remote-control device coupled to the accelerator pedal of the automobile.

Fig. 1 shows the bracket 56 connected to an automobile brake pedal P, the lower end of said brake pedal being received in the mounting channel 57 and clamped therein by the set screw 59. Fig. 2 shows the bracket 56 connected to the accelerator pedal A of the automobile. In this instance, the top end of the accelerator pedal is contained in the mounting channel 58 and is clamped therein by the set screw 60.

The control unit 10 can now be taken to a remote spot about the automobile, and the handle 13 pulled outwardly from the housing 11 to cause responsive action of the actuating unit 43 and depression of the foot pedal to which it is attached.

It will be observed that when the rod 12 is pulled outwardly of the housing 11 by means of handle 13, the actuating unit rod 45 is drawn out of the housing 44 by the same amount. To depress the foot pedal, the connecting wire 27 is tensioned, while to release or raise the foot pedal, the connecting wire 27 is compressed within the flexible tube 25. To properly actuate the brake system of modern vehicles requires pressures of up to fifty pounds while accelerator control requires pressures of up to ten pounds. As both brake and accelerator pedals are returned by spring action, the remote control device of the invention is primarily concerned with producing a one-way heavy duty action capable of producing pressures of fifty pounds per square inch for depression of the foot pedals. The return action must be capable of returning the attached foot pedals without reliance upon the pedal spring action, but in any event, the return pressure need not be in excess of four or five pounds.

The control cable 24 is therefore provided with a novel construction capable of high tensile pressure in excess of fifty pounds, and also capable of returning the attached pedals at reduced pressures. Since the flexible tube 25 is enclosed by a flexible cover 26 of plastic or rubber, the latter permits the flexible tube 25 to be permanently lubricated by means of a light grease thereby reducing friction with the internal wires. The flexible tube 25 is made of a continuous tight wound wire helix to resist buckling or distortion when compression pressures are applied at each end. It will be understood that when the internal wires 27 are pulled through the tube to create pedal pressure, the tube 25 must resist such tensile pressure by an inverse compression pressure. Therefore the flexible tube 25 must be relatively stiff to resist distortion and yet permit radius bends in the order of twelve inches.

The plurality of internal wires 27 of small diameter increase the surface contact against the wall of tube 25. In addition, the tensile load is equally distributed between the wires so that constant pressures per square inch are considerably less as compared to a single wire. A single wire possessing the same tensile and compression ability requires more effort to wrap itself around the normal bends when the device is in use. Further, a large single wire will become permanently set if inadvertently bent too sharply. A plurality of small diameter wires are capable of extremely small radius bends and will perfectly return to original straightness. The flexible cable construction employs a large clearance between the internal walls of tube 25 and wires 27 as compared to the close fitting casing and wire in general use. The flexible tube 25 has sufficient strength to be shape retaining independently of the internal wires 27, in contrast to the usual flexible casing which is dependent upon a heavy, solid internal wire which influences the casing form.

In use of the control unit 10, the mechanic may lie beneath the automobile, stand beneath the vehicle while the same is on a lift or over a pit, or stand leaning over the motor, with his foot in the stirrup 19, so that he is able to operate said control unit with one hand while testing or adjusting the engine, brake mechanism, etc. with the other hand. When a selected steady engine speed or brake pressure is required, the foot pedal may be locked in adjusted position by tightening the set screw 23, thereby freeing both hands of the mechanic. The rod 12 may be provided with a scale 75 calibrated in units of length, as for example in inches, whereby the operator may visually determine the distance to which the attached foot pedal has been depressed, or to determine the pedal position before, during, and after final adjustments have been made.

Fig. 7 shows a modified form of remote control device in which, instead of a mechanical flexible cable, a hydraulic line is used to connect the control and actuating units. The remote control assembly shown in Fig. 7 comprises a control unit 80 and an actuating unit 81. The control unit 80 includes a hollow cylindrical housing 82 closed at its top end by a cap 83 which has a central slide bearing 84. A rod 85 extends slidably through said slide bearing 84 and has a handle 86 affixed to its top end. The bottom end of the housing 82 is closed by a fixed cover member 87 to which is rigidly affixed the stirrup 88.

The bottom end of the rod 85 carries an end piece or extension 89 which is turnably mounted thereon. This rotatable mounting is effected by a pin 90 affixed to and depending from the bottom end of the rod 85 and turnable in a bore 91 in the end piece 89. The pin 90 has a head 92 located within a transverse bore 93 in the rod extension 89. The rod extension 89 is fixed to a circular disc 94 which is slidable within the housing 82. One end of a bellows 95 is secured to the disc 94 while the other end of said bellows is secured to the inner wall surface of the bottom cover member 87, as by soldering 96.

The bottom wall of cover member 87 has a transverse bore 99 extending therethrough, and an aperture 98 connecting the interior of bellows 95 with said transverse bore 99. The bore 99 is closed at one end by a plug 100, and at its other end communicates with a coupling member 101 which is connected with a flexible pipe 102.

The rod 85 is provided with a calibrated scale 103 and may be locked in an adjusted position by a set screw 104 in the manner previously described in connection with the embodiment of Figs. 1–4.

The actuating member 81 of Fig. 7 comprises a cylinder 105 closed at its top end by a cap 106 having a central slide bearing 107 in which a rod 108 is mounted for longitudinal sliding movement. The rod has an extension 109 turnably mounted thereon by means of a pin 110 rotatably extending through a bore 111 and having a head 112 contained in a tranverse bore 113. The extension 109 carries a circular disc 114. The bottom end of housing 105 is closed off by a closure member 115 which has at its bottom end a swivel tube 116 mounted on a base 117 by a pivot pin 118, in such a manner that the housing 105 may swivel on the base 117, the latter being of the same construction as previously described in connection with the base 64 of the device shown in Figs. 1–4.

A bellows 119, of similar construction to the bellows 95, is contained within the housing 105, being connected at one end to the disc 114 and at its other end to the closure member 115. The closure member 115 has a transverse bore 121 which communicates with the interior of the bellows 119 through an aperture 120. The bore 121 is closed at one end by a plug 122 and is connected at its other end to the flexible pipe 102 by a coupling member 123.

The two bellows 95, 119 and their connecting pipe 102 constitute a closed hydraulic system and are filled with hydraulic fluid 97. The bellows 95 and 119 may be metallic, rubber, rubber-impregnated fabric, or other material having the ability to withstand distortion of its convoluted walls and possible puncture of the walls due to excessive pressure. The bellows structure is also made to compress to about one-half its normal extended length.

The use of the bellows as shown is possible because relatively low pressures are involved. For example, a bellows having a two and one-half inch diameter would have an area of about five square inches. As the normal operating pressure required is in the order of fifty pounds, the bellows therefore functions on about ten pounds per square inch pressure.

It will be apparent that downward movement of handle 86 of the control unit 80 will compress the bellows 95 and cause the bellows 119 of the actuating unit 81 to expand, thereby sliding the rod 108 outwardly of the housing 105. The rod 108 carries on its end a mounting bracket identical the bracket 56, for attachment to an automobile foot pedal. Further, the base member of stand 117 includes a clamping assembly identical to the assembly 69, 70, 73, 74 shown in Fig. 3a, whereby the actuating unit 81 may be immovably mounted within an automobile.

With either of the two devices shown, the operator is provided with a finger-tip feel of the foot pedal being operated, and can easily determine when a brake pedal engages, for example. This "feel" of the pedal is afforded to the operator because in both of the previously described embodiments, the action of the handle is directly conveyed to the actuating unit without the interposing of mechanical advantage elements such as linkages, screw threads and the like. The invention may be used for a large variety of testing and adjusting operation, some of which are as follows: bleeding of air from hydraulic systems, leakage test, visual tests of brake cylinder and shoe action, brake adjustment, brake light tests, generator and voltage regulator tests, cooling system examination, ignition timing, distributor point testing, cylinder comparison tests, ignition test, carburetion tests etc.

While preferred embodiments of the invention have been shown and described herein, it is obvious that numerous additions, changes and omissions may be made in the specific structure shown without departing from the spirit and scope of the invention.

I claim:

1. A remote control device for selectively actuating an automobile foot pedal from a remote location around the automobile, said device comprising a control unit, an actuating unit, and a flexible cable operatively connecting said units, said control unit and actuating unit both including a hollow housing and a rod slidable within said housing, said actuating unit also including means for releasably mounting said actuating unit immovably within said automobile proximate to said foot pedal, and means for connecting the end of said actuating unit rod to said foot pedal, said flexible cable comprising a flexible tube and a plurality of small diameter, high tensile wires slidably contained within said tube, the ends of said wires being connected to the respective rods of said control and actuating units for sliding movement of said actuating unit rod in response to manual movement of said control unit rod.

2. A remote control device according to claim 1 in which said wires are fixed to a respective bead at each end thereof, and said control and actuating unit rods each have a slot sized to receive the respective beads, the beads being rotatably seated in said slots.

3. A remote control unit according to claim 2 in which each of the rods have a longitudinal groove communicating with the respective slot and positioned to receive the wires leading from the respective bead seated in said slot.

References Cited in the file of this patent

UNITED STATES PATENTS

| | | |
|---|---|---|
| 1,322,397 | Ball | Nov. 18, 1919 |
| 1,907,835 | Langbein | May 9, 1933 |
| 2,177,469 | White | Oct. 24, 1939 |
| 2,465,183 | Allen | Mar. 22, 1949 |
| 2,513,850 | Digman | July 4, 1950 |
| 2,649,814 | Brazell | Aug. 25, 1953 |
| 2,711,228 | Shank | June 21, 1955 |

FOREIGN PATENTS

| | | |
|---|---|---|
| 185,628 | Austria | May 25, 1956 |